United States Patent
Knipfer et al.

(10) Patent No.: US 10,169,807 B2
(45) Date of Patent: Jan. 1, 2019

(54) MANUFACTURING ADAPTIVE ORDER LOAD FOR COMPLEX CONFIGURE TO ORDER PRODUCTS

(71) Applicant: INTERNATIONAL BUSINESS MACHINES CORPORATION, Armonk, NY (US)

(72) Inventors: Ivory Wellman Knipfer, Rochester, MN (US); Jason Scott Lee, Oronoco, MN (US); Antoine George Sater, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 14/841,493

(22) Filed: Aug. 31, 2015

(65) Prior Publication Data

US 2016/0063605 A1    Mar. 3, 2016

Related U.S. Application Data

(63) Continuation of application No. 14/474,493, filed on Sep. 2, 2014.

(51) Int. Cl.
*G06Q 30/06* (2012.01)
*G06F 17/30* (2006.01)

(52) U.S. Cl.
CPC ... *G06Q 30/0633* (2013.01); *G06F 17/30979* (2013.01); *G06Q 30/0635* (2013.01)

(58) Field of Classification Search
CPC .................................................. G06Q 30/0633

USPC ........................................................ 705/26.8
See application file for complete search history.

(56) References Cited

U.S. PATENT DOCUMENTS

| 7,840,441 | B2 | 11/2010 | Erickson et al. | |
|---|---|---|---|---|
| 8,010,217 | B2 | 8/2011 | Knipfer et al. | |
| 2012/0150693 | A1* | 6/2012 | Dueck | G06Q 10/06312 705/26.81 |
| 2012/0284340 | A1* | 11/2012 | Young | G06F 17/3071 709/204 |

(Continued)

OTHER PUBLICATIONS

Schwartz, Matthew. "Searching for Goldilocks." B to B, vol. 97, No. 5, 2012.*

(Continued)

*Primary Examiner* — Alexis M Casey
(74) *Attorney, Agent, or Firm* — Yudell Isidore PLLC (57) ABSTRACT

A method selectively modifies an existing production order based on a change request. An order configuration module (OCM) receives order specifications for a second order that replaces and/or modifies a first order, while the first order is being fulfilled. The OCM generates hash tag pairs respectively associated with various characteristics of the orders. For each hash tag pair, the OCM compares a first hash tag associated with the first order with a second hash tag associated with the second order, using an established pattern. If the hash tags match, the OCM includes within a second production order, an unchanged production specification corresponding to the first hash tag. If a match does not occur, the OCM initiates an order reload, which provides, within the second production order, new production specifications that are associated with the second hash tag.

7 Claims, 7 Drawing Sheets

(56) References Cited

U.S. PATENT DOCUMENTS

2014/0372998 A1 12/2014 Salameh et al.
2015/0134926 A1* 5/2015 Yang ................... G06F 3/0611
                                                    711/167
2015/0149484 A1* 5/2015 Kelley .............. G06F 17/30398
                                                    707/748

OTHER PUBLICATIONS

Stopp, Courtney L., Non-Final Office Action, U.S. Appl. No. 14/474,493, The United States Patent and Trademark Office, dated Feb. 7, 2017, pp. 1-26.

Stopp, Courtney L., Final Office Action, U.S. Appl. No. 14/474,493, The United States Patent and Trademark Office, dated Aug. 4, 2017.

* cited by examiner

| Hash Tag Definition Models |||||
| Type | For Order Types | Algorithm to create tag | How Tag is built (reference info) |
| --- | --- | --- | --- |
| 404 ORDER_CONTENT | BOX,MES, RACK | PGM_1 | Tag is signature of all customer orderable content |
| 406 PEER_ORDERS | BOX,MES, RACK | PGM_2 | Tag is signature of group of orders to be ship together per customer request |
| 408 WORK_UNIT | BOX,MES, RACK,ASM | PGM_3 | Tag is signature of components, quantity, & placement for each unit of work in a system |
| 410 SHIP_GROUP | BOX,RACK | PGM_4 | Tag is signature of components, quantity for each type 'G' unit of work in system |
| DELIVERY_INFO | *ALL | | Tag representing delivery address, billing address, contact info |
| DATE_INFO | *ALL | | Date tag |
| ADDL_ORDER_DATA | BOX | | |
| MFG_INSTRUCTION | BOX,RACK | | |

| Hash Tag Activity Model ||||||||
|---|---|---|---|---|---|---|---|
| Group | Ord Type | Step | Next If= | Next If<> | Type | Action if= | Action if<> | What is to occur |
| 10 | *ALL | STR | 050 | 020 | ORDER_CONTENT | | RUN_ORDER_RELOAD | Reload order with identical content |
| 20 | B,M,R | 020 | 050 | 030 | WORK_UNIT | | RUN_PARTIAL_RELOAD | Reload matching units of work with identical content |
| 20 | B,R | 020 | END | END | SHIP_GROUP | | RUN_SG_RELOAD | Reload matching ship group unit |
| 30 | B,R | 030 | 040 | END | NA | RUN_FULL_RELOAD | | Reload Order with complete alteration identification |
| 40 | AND | 040 | 050 | 050 | PEER_ORDERS | | RUN_ASSOC_CLEANUP | Match Associations for Peer Orders |
| 50 | AND | 050 | 060 | 060 | DELIVERY_INFO | RUN_DELIVERY_CLEANUP | | Apply current delivery information |
| 60 | AND | 060 | END | END | DATE_INFO | RUN_DATE_CLEANUP | | Apply Current Date |
| 70 | AND | | | | INST. | RUN_PROCESS_UPDATE | | If we have a process break-in, don't stop the in-process orders and update the processes(instructions) for only those PORTIONS of the orders that are unstated |

504 — row 10
506 — row 20 (B,M,R)
508 — row 20 (B,R)
510 — row 40
512 — row 50

MANUFACTURING ADAPTIVE ORDER LOAD FOR COMPLEX CONFIGURE TO ORDER PRODUCTS

PRIORITY CLAIM

The present application is a continuation of U.S. patent application Ser. No. 14/474,493, filed on Sep. 2, 2014, the content of which is incorporated herein by reference in its entirety.

BACKGROUND

1. Technical Field

The present disclosure generally relates to production order management systems and in particular to production order changes within production order management systems.

2. Description of the Related Art

Sales order change management is particularly complicated in a configure-to-order environment. Each new version of a sales order must be analyzed and reloaded to a manufacturing division to update the associated production order. Translation of sales order nomenclature to manufacturing nomenclature can be very involved. For example, this translation involves conversion from sales terminology to bills of material, explosion of bills of material into underlying components, assignment of assembly configuration requirements, creation of buildable entities (i.e., units of work), process routing assignment to each unit of work, application of electronic product enablement, manufacturing instructions, etc. An initial load of a production order is quite complicated in many industries but it is greatly magnified when altering a production order that is work-in-process. These changes can often be catastrophic in nature to the manufacturing activities and result in huge loss of productivity, loss in capacity, and/or missed customer shipments and revenue exposures.

A limited portion of the changes that are sent to manufacturing are driven by true orderable content changes received from a sales division. For example, these changes can involve a different feature code or machine type. A larger portion of the remaining changes are related to other characteristics such as: entity grouping of orders, instruction changes such as placement/connection, engineering change (EC) for parts, customer date change (which impacts EC effectivity) and order to order grouping across shipments. In addition, some of these changes include address changes which can impact shipment documentation and require changes to documentation language and/or product label changes. Most systems are geared towards content changes or address/delivery change, and manufacturing plants can invoke rework via a full "change order". With very complex configurations, it is very likely that the process is stopped, and the product is torn down and rebuilt.

BRIEF SUMMARY

Disclosed is a method that selectively modifies an existing production order based on a change request. An order configuration module (OCM) receives order specifications for a second order that replaces and/or modifies a first order, while the first order is being fulfilled. The OCM generates hash tag pairs respectively associated with various characteristics of the orders. For each hash tag pair, the OCM compares a first hash tag associated with the first order with a second hash tag associated with the second order, using an established pattern. If a match occurs between the first and second hash tags, the OCM includes within a second production order, an unchanged production specification corresponding to the first hash tag. If a match does not occur, the OCM initiates an order reload, which provides, within the second production order, new production specifications that are associated with the second hash tag.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a data processing system (DPS) and a computer program product that selectively modifies an existing production order based on a change request. An order configuration module (OCM) receives order specifications for a second order that replaces and/or modifies a first order, while the first order is being fulfilled. The OCM generates hash tag pairs respectively associated with various characteristics of the orders. For each hash tag pair, the OCM compares a first hash tag associated with the first order with a second hash tag associated with the second order, using an established pattern. If a match occurs between the first and second hash tags, the OCM includes within a second production order, an unchanged production specification corresponding to the first hash tag. If a match does not occur, the OCM initiates an order reload, which provides, within the second production order, new production specifications that are associated with the second hash tag.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
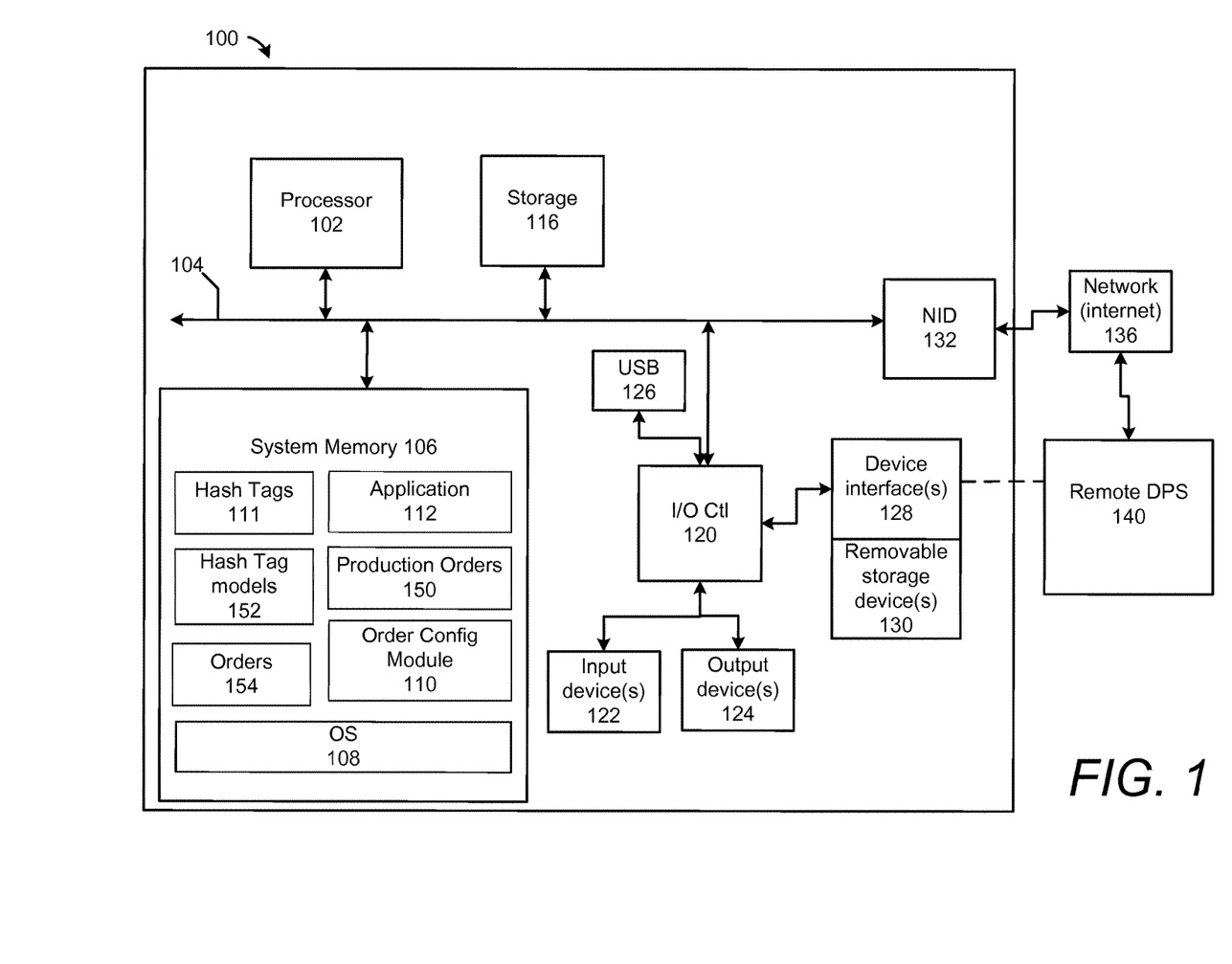
FIG. 1 illustrates an example data processing system (DPS) within which various aspects of the disclosure can be implemented, according to one or more embodiments.

FIG. 1 illustrates a block diagram representation of an example data processing system (DPS) 100, within which one or more of the described features of the various embodiments of the disclosure can be implemented. DPS 100 may be a handheld device, personal computer, a server, a network storage device, or any other suitable device and may vary in size, shape, performance and functionality. DPS 100 may include random access memory (RAM), one or more processors such as a central processing unit (CPU) or hardware or software control logic, ROM, and/or other types of nonvolatile memory. Additional components of DPS 100 may include one or more disk drives, one or more network ports for communicating with external devices as well as various input and output (I/O) devices, such as a keyboard, a mouse, and a display.

Referring specifically to FIG. 1, example DPS 100 includes one or more processor(s) 102 coupled to system memory 106 via system interconnect 104. System interconnect 104 can be interchangeably referred to as a system bus, in one or more embodiments. As shown, system memory 106 can include therein a plurality of modules, including operating system (OS) 108, firmware (not shown), and applications 112. In addition, system memory 106 includes order configuration module (OCM) 110, hash tags 111, production orders 150, hash tag models 152, sales orders 154. These various software and/or firmware modules can also be maintained in storage 116. The various software and/or firmware modules have varying functionality when their corresponding program code is executed by processor(s) 102 or other processing devices within DPS 100.

DPS 100 further includes one or more input/output (I/O) controllers 120 which support connection to and processing of signals from one or more connected input device(s) 122, such as a keyboard, mouse, touch screen, or microphone. I/O controllers 120 also support connection to and forwarding of output signals to one or more connected output device(s) 124, such as a monitor or display device or audio speaker(s). In addition, DPS 100 includes universal serial bus (USB) 126 which is coupled to I/O controller 120. Additionally, in one or more embodiments, one or more device interface(s) 128, such as an optical reader, a universal serial bus (USB), and/or a card reader, can be associated with DPS 100. Device interface(s) 128 can be utilized to enable data to be read from or stored to corresponding removable storage device(s) 130, such as a compact disk (CD), digital video disk (DVD), flash drive, or flash memory card. In one or more embodiments, device interface(s) 128 can also provide an integration point for connecting other device(s) to DPS 100. In one implementation, DPS 100 connects to remote DPS 140 using device interface(s) 128.

DPS 100 comprises a network interface device (NID) 132. NID 132 enables DPS 100 to communicate and/or interface with other devices, services, and components that are located external to DPS 100. These devices, services, and components can interface with DPS 100 via an external network, such as example network 136, using one or more communication protocols. In particular, in one implementation, DPS 100 uses NID 132 to connect to remote DPS 140 via an external network, such as network 136.

Network 136 can be a local area network, wide area network, personal area network, and the like, and the connection to and/or between network 136 and DPS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

Those of ordinary skill in the art will appreciate that the hardware, firmware/software utility, and software components and basic configuration thereof depicted in FIG. 1 may vary. The illustrative components of DPS 100 are not intended to be exhaustive, but rather are representative to highlight some of the components that are utilized to implement certain of the described embodiments. For example, different configurations of a DPS may be provided, containing other devices/components, which may be used in addition to or in place of the hardware depicted, and may be differently configured. The depicted example is not meant to imply architectural or other limitations with respect to the presently described embodiments and/or the general invention.

Figure 2:
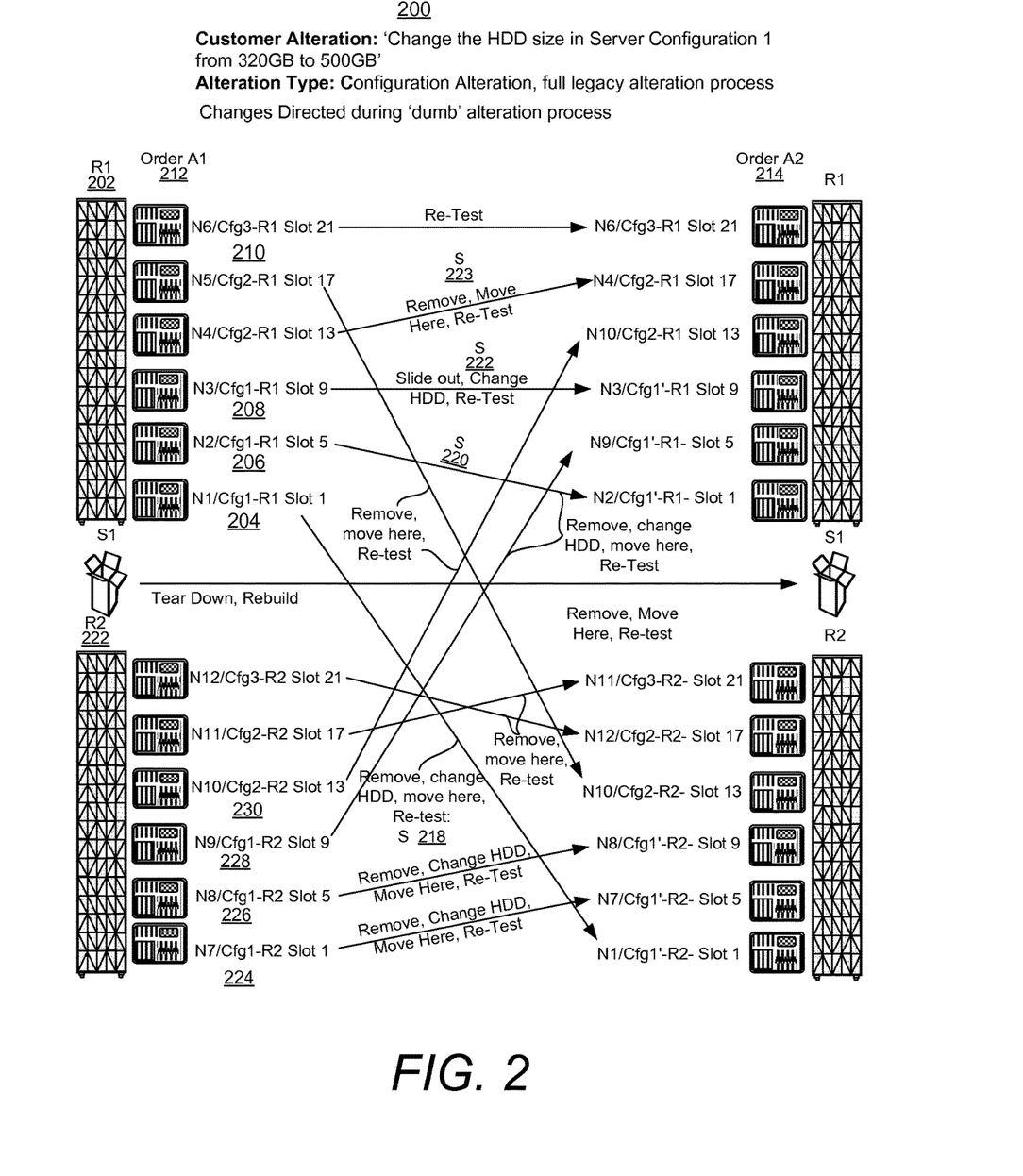
FIG. 2 illustrates a manufacturing order change environment, according to the prior art.

FIG. 2 illustrates a manufacturing order change environment, according to the prior art. Change environment 200 comprises a first rack illustrated as "R1" 202 into which completed or work-in-process "work units" for a first order are placed or inserted. The first order which is illustrated as "Order A1" 212 represents an order for which the work units that are configured for placement within "R1" 202 have been completed. As illustrated within change environment 200, order A1 specifies a number of work units which include a first work unit which is illustrated as "N1/Cfg1-R1 Slot 1" 204. In this example illustration, the example naming convention for work units provide a first identifier such as "N1" which uniquely identifies an individual work unit. In addition, a second identifier such as "Cfg1" indicates a work unit configuration. A third identifier such as "R1" indicates a rack in which a placement has been specified by the order (e.g., order "A1") for a respective work unit. A fourth identifier such as "Slot 1" indicates a particular position of the rack that has been specified by the order for a respective work unit.

In addition, change environment 200 also includes a second work unit which is illustrated and identified as "N2/Cfg1-R1 Slot 5" 206, a third work unit which is illustrated and identified as "N3/Cfg1-R1 Slot 9" 208 and a fourth work unit which is illustrated and identified as "N6/Cfg3-R1 Slot 21" 210.

Change environment 200 also includes a shipping group in which additional components and/or accessories associated with the order (e.g., order A1) are shipped. In the example of FIG. 2, the shipping group is illustrated as "S1".

Change environment 200 also comprises a second rack illustrated as "R2" 222 into which completed or work-in-process "work units" for the first order are placed or inserted. As illustrated, within change environment 200, order A1 specifies a seventh work unit which is illustrated as "N7/Cfg1-R2 Slot 1" 224. In addition, change environment 200 also includes an eighth work unit which is illustrated and identified as "N8/Cfg1-R2 Slot 5" 226, a ninth work unit which is illustrated and identified as "N9/Cfg1-R2 Slot 9" 228 and a tenth work unit which is illustrated and identified as "N10/Cfg2-R2 Slot 13" 230.

Change environment 200 includes a second order, "order A2" 214, which represents an update/modification or replacement for the first order, order A1 212. A change order is used to fulfill order A2 214 by providing change specifications that can be used to modify order A1 212. In change environment 200, an identified set of change specifications can be used to target changes to a specific work unit. For example, a first set of change specifications, which is illustrated as S (specification) 218, target changes to first work unit 204. S 218 specifies work order actions which include the following: (i) removing the corresponding work unit; (ii) changing the hard disk drive (HDD) from an HDD having a first size specified using order A1 to a modified or second HDD having a second size specified using order A2; (iii) following the modification, moving the work unit from a first location at R1 (i.e., rack 1) slot 1 to a second location at R2 (i.e., rack 2) slot 1; and (iv) testing the modified work unit.

A second set of change specifications, S 220, specifies work order actions which include the following: (i) removing the corresponding work unit; (ii) changing the hard disk drive (HDD) from an HDD having a first size specified using order A1 to a modified or second HDD having a second size specified using order A2; (iii) following the modification, moving the work unit from a first location at R1 (i.e., rack 1) slot 5 to a second location at R1 slot 1; and (iv) testing the modified work unit.

A third set of change specifications, S 222, specifies work order actions which include the following: (i) removing the corresponding work unit; (ii) changing the hard disk drive (HDD) from an HDD having a first size specified using order A1 to a modified or second HDD having a second size specified using order A2; (iii) following the modification, returning the work unit retrieved from a first location at R1 (i.e., rack 1) slot 9 to the same first location at R1 slot 9; and (iv) testing the modified work unit.

A fourth set of change specifications, S 223, specifies work order actions associated with a second type of work unit. These work order actions include the following: (i) removing the corresponding work unit; (ii) following the modification, moving the work unit from a first location at R1 (i.e., rack 1) slot 13 to a second location at R1 slot 17; and (iii) testing the un-modified work unit in the new location.

A number of other change specifications involving the first type of work unit, the second type of work unit and a third type of work unit are illustrated within change environment 200. However, when these change specifications are received within a change environment having the disclosed features and capabilities, as described in FIG. 3, OCM 110 intelligently determines a more concise set of production order specifications and actions that can be used to fulfill the second order.

Figure 3:
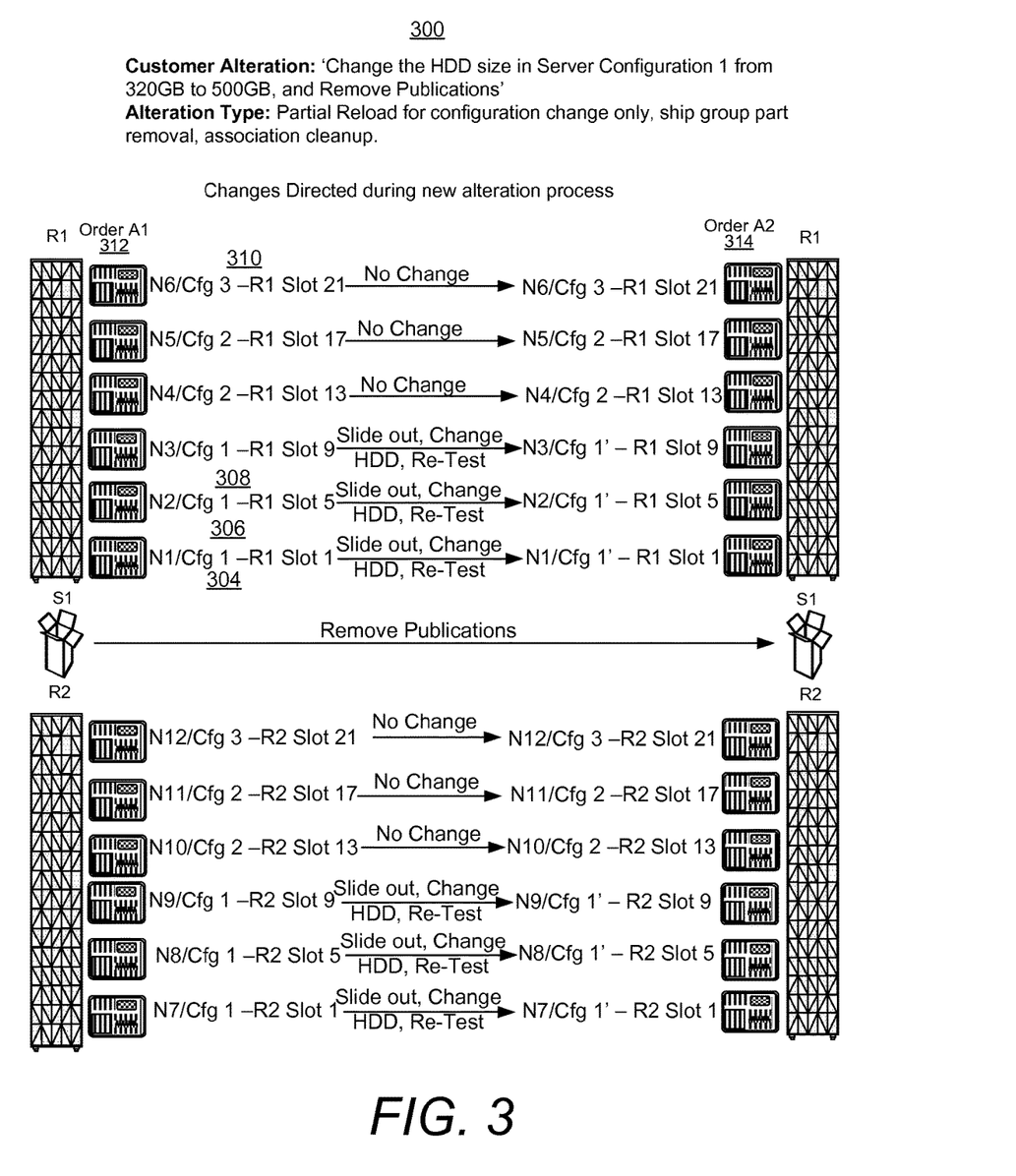
FIG. 3 illustrates a manufacturing order change environment, according to one embodiment.

FIG. 3 illustrates an example manufacturing order change environment, according to one embodiment. Change environment 300 is associated with a customer alteration by which a customer specifically requests changing the hard disk drive (HDD) size in server configuration 1 (cfg1) from 320 GB to 500 GB, and removing the publications. Change environment 300 comprises order A1 312 representing the first order and which is substantially identical to order A1 212 (FIG. 2). In addition, change environment 300 comprises order A2 314 which is substantially identical to order A2 214 (FIG. 2), which represents the second order. In one implementation, a first set of order specifications comprising at least one specification is associated with the first order. OCM 110 (FIG. 1) generates a first production order from the first set of order specifications and initiates order fulfillment for the received first order using the first production order generated from the first set of order specifications. The second order is intended to replace or modify the first order, and may be received while order fulfillment for the first order is in progress. A second set of order specifications is associated with the second order.

In one embodiment, OCM 110 receives, within a set of order specifications, one or more of: order content and component specifications, component grouping specifications, delivery date information, shipment information, billing information and specified changes associated with various aspects of a previous order specification.

In change environment 300, following receipt of the second order, OCM 110 generates a first set of hash tags from the first set of order specifications, according to one embodiment. In addition, OCM 110 generates a second set of hash tags from the second set of order specifications. In one embodiment, OCM 110 saves the first production order as an initial version of a second production order corresponding to the second order.

OCM 110 selects for comparison each of at least one hash tag pair using the first and second sets of hash tags. The selection is made according to an established pattern and sequence for comparing hash tag pairs. In one embodiment, the selected hash tag pair(s) includes an initial hash tag pair comprising a first hash tag from the first set of hash tags and a second hash tag from the second set of hash tags. In one or more related embodiments, each additional hash tag pair is individually selected following a result of a previous comparison of hash tags of a hash tag pair.

In one embodiment, OCM 110 utilizes the established pattern and/or sequence which is based upon a hierarchical arrangement for an identified set of hash tags generated for a corresponding order specification. In one or more related embodiments, OCM 110 determines a hierarchical arrangement for the identified set of hash tags using a pre-established hierarchy of hash tags respectively associated with at least one of (a) one or more known order specification characteristics associated with product configuration and (b) one or more order characteristic types. The pre-established hierarchy can be developed using functional relationships and dependencies between order specification characteristics associated with different hash tags. OCM 110 is able to identify the matches and mismatches between a first set of hash tags and a second set of hash tags by sequentially comparing, using the determined hierarchical arrangement and one or more results of previous comparisons, hash tags from the first set of hash tags with hash tags having a same respective characteristic type from the second set of hash tags.

Hash tags corresponding to the first order work unit specified by order specifications from the first order, order A1 312, are compared with hash tags corresponding to the second order work unit specified by order specifications from the second order, order A2 314. More specifically, a hash first tag associated with a specific characteristic type of the work unit is compared with a second hash tag having a same characteristic type, and the first and second hash tags represent an appropriate pairing. In one example implementation, HDD size can be the particular characteristic type.

OCM 110 determines whether a match exists between hash tags of a respective hash tag pair. If a match exists between hash tags of a respective hash tag pair, OCM 110 maintains, without modification, corresponding production specifications from the initial, second production order. As illustrated in change environment 300, there are no change specifications targeting cfg2 and cfg3 work units such as "N6/cfg3" 310 in change environment 300.

Compared with change environment 300, change environment 200 (FIG. 2 prior art) illustrates a completely different process. For example, although several changes associated with cfg2 and cfg3 work units are shown in change environment 200, there are no changes associated with cfg2 and cfg3 work units such as "N6/cfg3" 310 in change environment 300 which utilizes OCM 110.

However, if a match does not exist between hash tags of the respective hash tag pair, OCM 110 selectively modifies the second production order, initiating an order reload to (a) remove and/or reverse production specifications associated with fulfilling the first order and (b) provide new production specifications corresponding to the second order. OCM 110 intelligently provides only the required changes. For example, in change environment 300, changes to the HDD and re-testing are specified and/or performed.

Compared with change environment 300, change environment 200 (FIG. 2 prior art) illustrates a completely different process. For example, in change environment 200, several location changes associated with cfg1 work units, including work units 204 and 206, are shown. However, in change environment 300 which utilizes OCM 110, there are no location changes associated with cfg1 work units which include work units 304 and 306. In change environment 300, changes to the HDD and re-testing are performed without location changes to corresponding work units.

In one embodiment, OCM 110 maintains, within the second production order, a status associated with any production specifications corresponding to one or more executed actions associated with the first production order and with the matching pair of hash tags.

In one embodiment, OCM 110 identifies when there is at least one hash tag from the first set of hash tags for which there is no corresponding hash tag from the second set of hash tags to be compared against. In response to identifying that there is at least one hash tag from the first set of hash tags for which there is no corresponding hash tag from the second set of hash tags to be compared against, OCM 110 initiating an order reload that selectively removes from the second production order production specifications associated with the first hash tag. In addition, OCM 110 provides production specifications to reverse executed actions associated with production specifications associated with the first hash tag.

According to another aspect of the disclosure, OCM 110 determines whether there is at least one hash tag from the second set of hash tags for which there is no corresponding hash tag from the first set of hash tags to be compared against. In response to determining that there is at least one hash tag from the second set of hash tags for which there is no corresponding hash tag from the first set of hash tags to be compared against, OCM 110 provides within the second production order new production specifications corresponding to the at least one hash tag from the second set of hash tags.

OCM 110 performs order alteration using a configurable chain of small and manageable subsets of identity modeling, with conditional, user-defined actions and exits at each step. The configurable alteration process incorporates user-defined steps, inputs or combinations of inputs, with specific function calls driven by each step. OCM 110 utilizes this configurable process to identify types and levels of hash tags or identification tags to be calculated and applied at each step of the alteration process, based on the type of order undergoing alteration. In addition, OCM 110 generates hash tags using user-configurable hash tag generation algorithms. OCM 110 sequentially applies singular or multiple identity tests/evaluations at each alteration process step in order to determine likeness/unlikeness and to identify the "true" changes. OCM 110 applies the correct alteration algorithm or algorithms, sequentially, to the complete orders or subsets of orders requiring alteration, while leaving some orders or subsets of orders unchanged.

Figure 4:
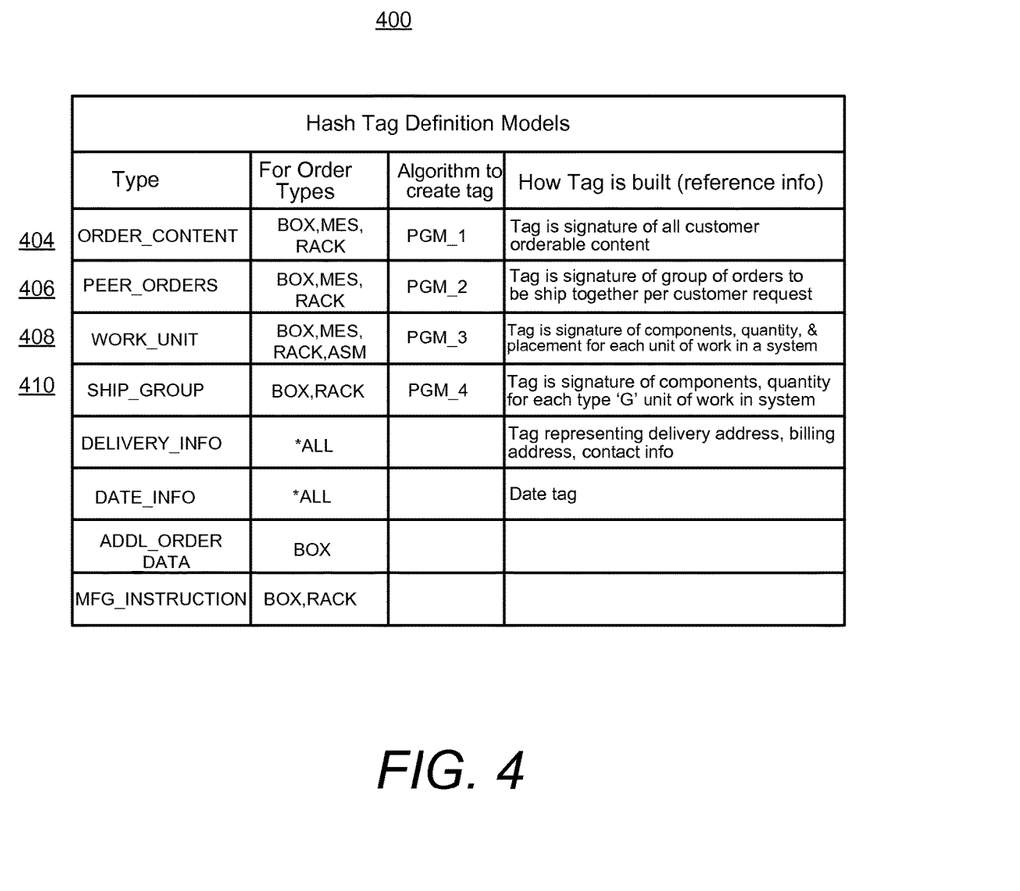
FIG. 4 is a table illustrating example hash tag definition models, in accordance with one or more embodiments.

FIG. 4 is a table illustrating example hash tag definition models, according to one embodiment. Table 400 comprises four (4) columns including a first column which identifies hash tag types. In addition, table 400 comprises a second column that identifies an order type corresponding to a hash tag type identified in the first column. The third column identifies an algorithm that is used to create a hash tag having a respective type that is identified in the first column. The fourth column describes how a respective hash tag is built and/or the reference information included in construction of the hash tag.

First row 404 describes a first hash tag type identified as "Order_Content" which is defined as a hash tag signature for all customer orderable content. First row 404 indicates that an "Order_Content" hash tag can be generated for a number of order types including box orders, miscellaneous equipment specification (MES) orders and rack orders using an algorithm identified as "PGM_1".

Second row 406 describes a second hash tag type identified as "Peer_Orders" which is defined as a hash tag signature for group orders to be shipped together per customer request. Second row 406 indicates that "Peer_Orders" hash tags can be generated for a number of order types including box orders, miscellaneous equipment specification (MES) orders and rack orders using an algorithm identified as "PGM_2".

Third row 408 describes a third hash tag type identified as "Work_Unit" which is defined as a hash tag signature of components, quantity, and placement for each unit of work in a system. Third row 408 indicates that a "Work_Unit" hash tag can be generated for a number of order types including box orders, miscellaneous equipment specification (MES) orders and rack orders using an algorithm identified as "PGM_3".

Fourth row 410 describes a fourth hash tag type identified as "Ship_Group" which is defined as a hash tag signature of components, quantity for each type 'G' (i.e., grouping) unit of work in a system. Fourth row 410 indicates that a "Ship_Group" hash tag can be generated for a number of order types including box orders and rack orders using an algorithm identified as "PGM_4".

Figure 5:
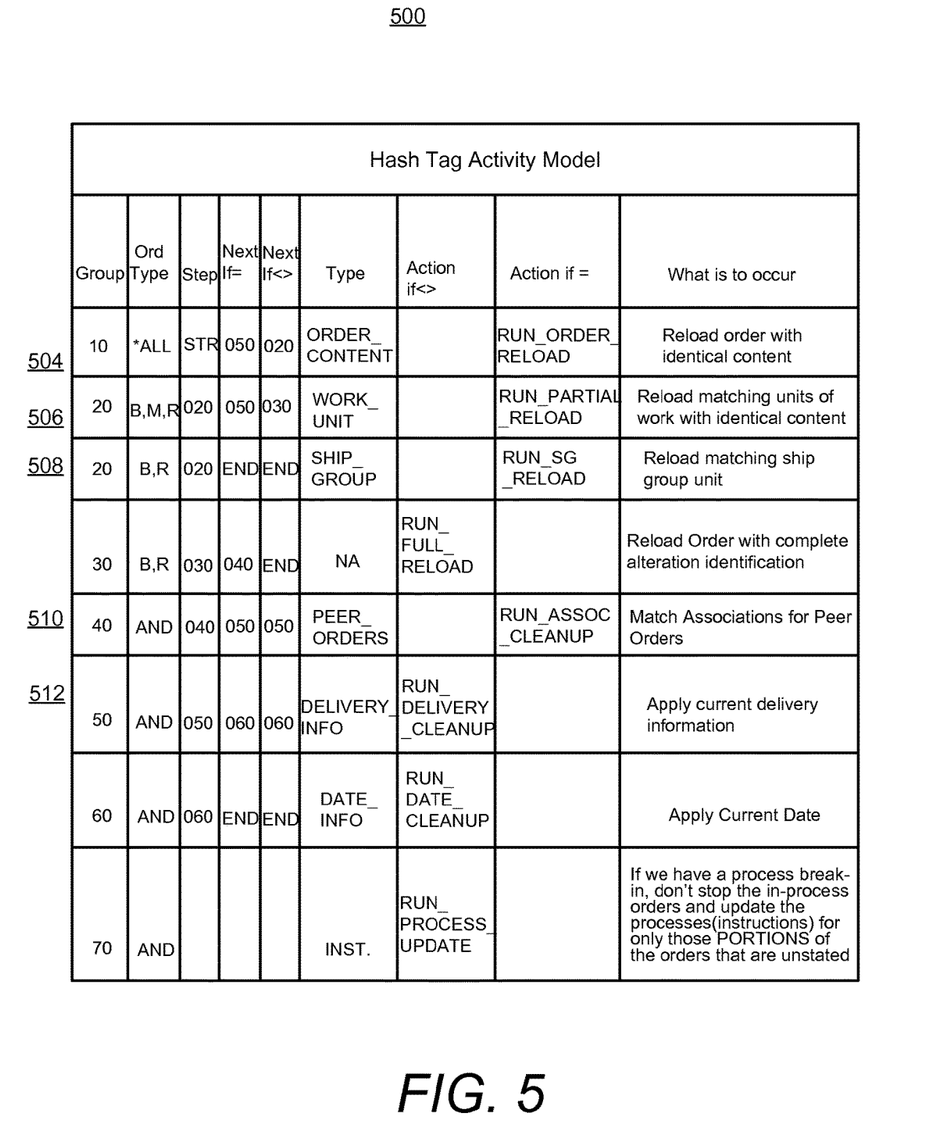
FIG. 5 is a table illustrating hash tag activity models, in accordance with one or more embodiments.

FIG. 5 is a table illustrating hash tag activity models, according to one embodiment. Table 500 comprises nine (9) columns including a first column which identifies a group to which a respective hash tag type belongs. Based on group membership, a next comparison for a corresponding pair of hash tags having a respective type can be determined.

In addition, table 500 comprises a second column that identifies an order type corresponding to the identified hash tag group of the first column. The third column identifies an ordered step within a sequence of hash tag evaluations/comparisons algorithm which step can be based on results of other hash tag evaluations. The fourth column identifies a next hash tag group for which hash tag evaluations are performed if a match occurs for a current evaluation of a hash tag pair from a corresponding group. The fifth column identifies a next hash tag group for which hash tag evaluations are performed if a mismatch occurs for a current evaluation of a hash tag pair from a corresponding group.

The sixth column identifies a hash tag type corresponding to the hash tag group identified in the first column. The seventh column specifies an action to be performed on a corresponding order specification if a mismatch occurs for a current evaluation of a hash tag pair from a corresponding group. The eighth column specifies an action to be performed on a corresponding order specification if a match occurs for a current evaluation of a hash tag pair from a corresponding group. The ninth column defines the specified action which is identified in the seventh or eighth column.

Table 500 comprises eight (8) rows. However, a selected subset of rows are particularly highlighted and described herein. First row 504 describes a hash tag group identified as group "10", which includes hash tags types that are to be evaluated. In particular, a first hash tag from a first order and a second hash tag from a second order which both have a same hash tag type associated with group "10" are compared against each other as a first comparison within a sequence of ordered comparisons. First row 504 indicates that all order types provide hash tags that belong to hash tag group 10 which is associated with "Order_Content" (i.e., all customer orderable content). In addition, first row 504 indicates at the fourth column that if a match occurs when hash tags from hash tag group "10" are compared against each other, a next hash tag comparison step occurs between hash tags belonging to hash tag group 50, which includes hash tags associated with delivery information. First row 504 indicates at the fifth column that if a mismatch occurs when hash tags from hash tag group "10" are compared against each other, a next hash tag comparison step occurs between hash tags belonging to hash tag group 20 which includes hash tags associated with at least one of work units and ship group units. First row 504 indicates at the eighth and ninth columns that if a match occurs, production specifications with identical content associated with a matching hash tag from the first order is reloaded to be associated with the second production order.

Hash tag group 20 includes "Work_Unit" hash tags and "Ship_Group" hash tags and hash tag comparisons and activity models associated with the respective hash tag types are described in second row 506 and third row 508, respectively. Second row 506 indicates that "Work_Unit" hash tags which are included within group 20 can be generated for several order types including box, MES and rack orders. As previously indicated, if a mismatch was detected in a previous STR (i.e., starting) step (first row 504), group 20 identifies a second evaluation step which is identified as step 020 within second row 506. If a match occurs between hash tags for the first and second orders having a "Work_Unit" hash tag type, a next evaluation step is step 050, as indicated at the fourth column of second row 506. If a mismatch occurs between hash tags for the first and second orders having a "Work_Unit" hash tag type, a next evaluation step is step 030, as indicated at the fifth column of second row 506. Second row 506 further indicates at the eighth and ninth columns that if a match occurs, production specifications with identical/unchanged content associated with a matching hash tag from the first order is reloaded to be associated with the second production order.

Third row 508 indicates that "Ship_Group" hash tags, which are included within group 20, can be generated for several order types including box and rack orders. As previously indicated, if a mismatch was detected in a previous STR (i.e., starting) step (first row 504), group 20 identifies a second evaluation step which is identified as step 020 within third row 508. As indicated by third row 508, if a match occurs between hash tags for the first and second orders having a "Ship_Group" hash tag type, an "END" step is shown to be a next step as there are no further evaluation steps triggered from results of this evaluation. Similarly, if a mismatch occurs between hash tags for the first and second orders having a "Ship_Group" hash tag type, an "END" step is shown to be a next step as there are no further evaluation steps triggered from results of this evaluation. Third row 508 further indicates at the eighth and ninth columns that if a match occurs, production specifications corresponding to the matching ship group unit from the first production order are reloaded to be maintained within the second production order.

Table 500 also includes fifth row 510 which describes hash tag group 40 and the next evaluation steps and specified actions based on results of hash tag evaluations associated with "Peer_Orders" (i.e., peer orders). In particular, these hash tag evaluations can be used to match associations (i.e., perform an association cleanup) for peer orders. For example, OCM 110 can perform an association cleanup when OCM 110 determines that, while satisfying the overall result for a set of requested changes, no specification changes to the second production order associated with a specific work unit are required even if order specifications associated with the specific work unit was received. In addition, table 500 includes sixth row 512 which describes hash tag group 50 and the next evaluation steps and specified actions based on results of hash tag evaluations associated with "Delivery_Info" (i.e., delivery information).

Figure 6:
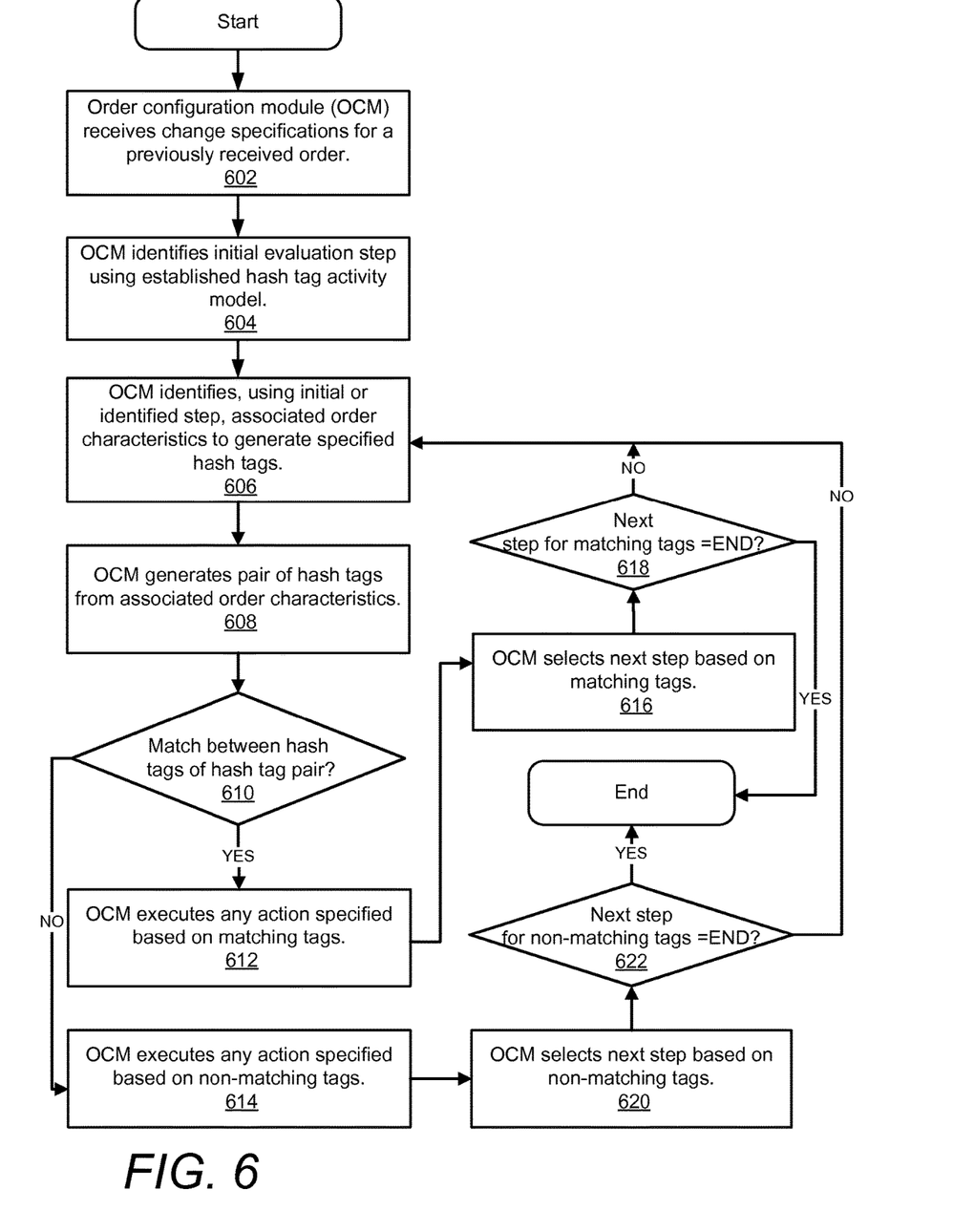
FIG. 6 is a flow chart illustrating a method for using an established pattern to selectively modify an existing production order based on a change request, in accordance with one or more embodiments.
Figure 7:
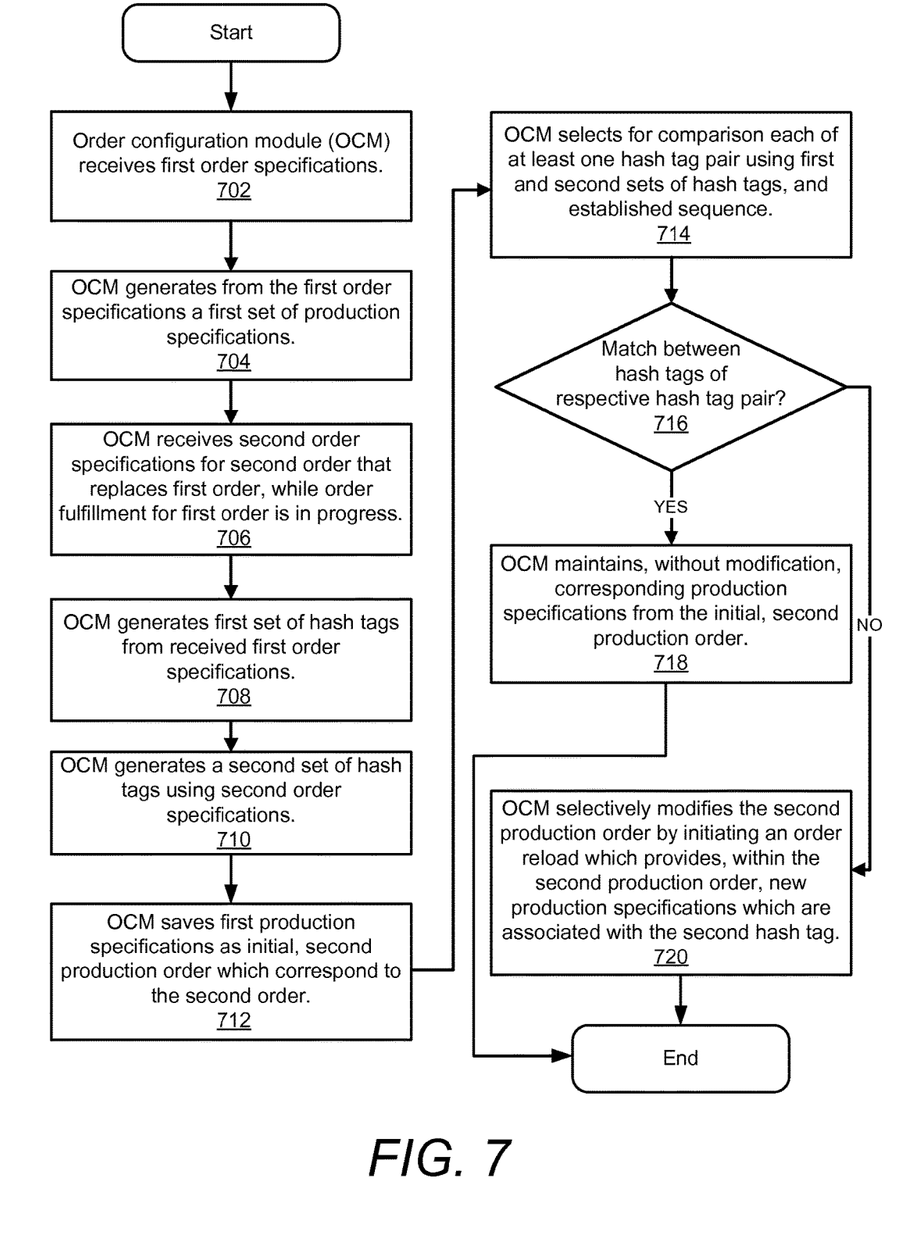
FIG. 7 is a flow chart illustrating a method for efficiently specifying updates to an existing production order, in accordance with one or more embodiments.

FIG. 6 and FIG. 7 present flowcharts illustrating example methods by which DPS 100 and specifically OCM 110 presented within the preceding figures performs different aspects of the processes that enable one or more embodiments of the disclosure. Generally, method 600 and method 700 collectively represent methods for selectively modifying an existing production order based on a change request. The description of each method is provided with general reference to the specific components illustrated within the preceding figures and specific reference to OCM 110 executing on processor 102. It is appreciated that certain aspects of the described methods may be implemented via other processing devices and/or execution of other code/firmware. In the discussion of FIG. 6 and FIG. 7, reference is also made to elements described in FIG. 1-FIG. 5.

FIG. 6 illustrates an example method for using an established pattern to selectively modify an existing production order based on a change request. Method 600 begins at start block and proceeds to block 602 where order configuration module (OCM) 110 receives change specifications for a previously received order. OCM 110 identifies an initial evaluation step using an established hash tag activity model (block 604). OCM 110 identifies, using an initial or current evaluation step, associated order characteristics to generate hash tags specified for the current evaluation step (block 606). In one embodiment, the current evaluation step can be either the initial evaluation step or any one of other identified evaluation steps. OCM 110 generates a pair of hash tags from the associated order characteristics (block 608). In one embodiment, the generated hash tag pair includes a first hash tag associated with the previously received order and a second hash tag associated with the change specification. In addition, the first and second hash tags share a same type of order characteristics. OCM 110 determines whether a match exists between the first hash tag and the second hash tag of the hash tag pair (decision block 610). If a match exists between the first and second hash tags, OCM 110 executes any specified action (if any action is specified) based on determining that the first and second hash tags match (block 612). For example, if the order characteristics type is "Order_Content", OCM 110, while performing an initial evaluation, can detect a matching pair of hash tags. As a result, OCM 110, using an established activity model, may specify an action that reloads an order with identical customer orderable content. OCM 110 selects a next (evaluation) step based on determining that the first and second hash tags match (block 616). OCM 110 then determines whether the next evaluation step associated with determining that the first and second hash tags match is an "END" or completion indicator step (decision block 618). If the corresponding next evaluation step is not the "END" step, the process returns to block 606 at which OCM 110 identifies (a) the "next" step as the current evaluation step and (b) the associated order characteristics to generate hash tags specified for the current evaluation step.

However, if, at block 610, a match does not exist between the first and second hash tags, OCM 110 executes any specified action based on determining that the first and second hash tags do not match (block 614). OCM 110 selects a next (evaluation) step based on determining that the first and second hash tags do not match (block 620). For example, if the order characteristics type is "Delivery_Info", as shown in sixth row 512 (Table 500), OCM 110, while performing an evaluation of hash tags subsequent to an initial evaluation step, can detect a non-matching pair of hash tags. As a result, OCM 110, using an established activity model, may, after specifying an action that applies new/updated delivery information to the order, identify step 60 as a next evaluation step. OCM 110 then determines whether the next evaluation step associated with determining that the first and second hash tags do not match is an "END" or completion indicator step (decision block 622). If the corresponding next evaluation step is not the "END" step, the process returns to block 606 at which OCM 110 identifies (a) the "next" step as the current evaluation step and (b) the associated order characteristics to generate hash tags specified for the current evaluation step. If the corresponding next evaluation step is the "END" step, the process proceeds to an end block.

FIG. 7 illustrates an example method for efficiently specifying updates to an existing production order. Method 700 begins at start block and proceeds to block 702 where order configuration module (OCM) 110 receives first order specifications for a first order. OCM 110 generates from the first order specifications a first set of production specifications used to fulfill the first order (block 704). OCM 110 receives second order specifications for a second order that replaces and/or modifies the first order, while order fulfillment for the first order is in progress (block 706). OCM 110 generates the first set of hash tags using the received first order specifications (block 708). As described within table 400 (FIG. 4), the various types of hash tags which are associated with different characteristics of an order are created using different respective algorithms. OCM 110 generates a second set of hash tags using the second order specifications (block 710). OCM 110 saves the first set of production specifications as an initial, second production order which corresponds to the second order (block 712). OCM 110 selects for comparison each of at least one hash tag pair using the first and second sets of hash tags, using an established pattern and sequence for comparing hash tag pairs (block 714). In one embodiment, the selected hash tag pair(s) includes an initial hash tag pair comprising a first hash tag from the first set of hash tags and a second hash tag from the second set of hash tags. In one or more related embodiments, each additional hash tag pair is individually selected following a result of a previous comparison of hash tags of a hash tag pair. OCM 110 determines whether a match exists between hash tags of a respective hash tag pair (decision block 716). If a match exists between hash tags of a respective hash tag pair, OCM 110 maintains, without modification, within the second production order, corresponding production specifications from the first production order which are also maintained within the initial version of the second production order (block 718). If a match does not exist between hash tags of the respective hash tag pair, OCM 110 selectively modifies the second production order by initiating an order reload which provides, within the second production order, new production specifications which are associated with the second hash tag (block 720). In one embodiment, the order reload (a) removes and, if necessary, reverses production specifications associated with filling the first order and (b) provides new production specifications corresponding to the second order (block 720). The process is completed at the end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method performed within a data processing system, the method comprising:

receiving, via at least one input device of the data processing system, a first set of order specifications that can be used for fulfilling a first order;

initiating, by a hardware processor of the data processing system, order fulfillment for the received first order using a first production order generated from the first set of order specifications;

receiving, via the at least one input device, a second set of order specifications for a second order that replaces or modifies the first order, while the first order is being fulfilled;

the hardware processor identifying a type of each of the first set of order specifications and a type of each of the second set of order specifications;

the hardware processor retrieving at least one first hash tag model corresponding to each type of the first set of order specifications from among a plurality of hash tag models stored within a memory of the data processing system, wherein each hash tag model of the plurality of hash tag models specifies at least one order type and at least one hash tag algorithm that can be applied to order specifications of the at least one order type to generate a set of hash tags;

the hardware processor applying the at least one first hash tag model to the received first set of order specifications based on the type of each of the first set of order specifications to generate a first set of hash tags, wherein in applying the at least one first hash tag model to the received first set of order specifications the hardware processor applies, to each order of the first set of order specifications, at least one hash tag algorithm that corresponds to the type of that order;

the hardware processor retrieving, from the memory, at least one second hash tag model corresponding to each type of the second set of order specifications;

the hardware processor applying the at least one second hash tag model to the received first set of order specifications based on the type of each of the second set of order specifications to generate a second set of hash tags, wherein in applying the at least one second hash tag model to the received second set of order specifications the hardware processor applies, to each order of the second set of order specifications, at least one hash tag algorithm that corresponds to the type of that order;

the hardware processor saving, to the memory, the first production order as an initial, second production order corresponding to the second order;

the hardware processor selecting, using an established pattern, at least one pair of hash tags including an initial pair of hash tags from the first and second sets of hash tags, wherein the established pattern is a hierarchical arrangement of hash tags based on corresponding types of order specifications;

the hardware processor comparing each pair of hash tags from the at least one pair of hash tags to identify matches and mismatches between respective pairings of hash tags; and for each respective pairing of hash tags that match, the hardware processor maintaining, to the memory within the second production order, existing production specifications which are associated with the matching hash tags.

2. The method of claim 1, further comprising:

for each respective pairing of hash tags that does not match, the hardware processor selectively modifying the second production order by initiating an order reload which removes production specifications of the first production order that correspond to the pairing of hash tags that do not match and which includes new production specifications of the second production order that correspond to the pairing of hash tags that do not match.

3. The method of claim 1, further comprising:

the hardware processor determining a hierarchical arrangement for the first and second identified sets of hash tags generated for the corresponding first and second sets of order specifications using a pre-established hierarchy of hash tags respectively associated with at least one of (a) one or more known specification characteristics associated with product configuration, and (b) one or more characteristic types, wherein the pre-established hierarchy is developed using functional relationships and dependencies between specification characteristics associated with different hash tags; and identifying the matches and mismatches between the first set of hash tags and the second set of hash tags by sequentially comparing, within the determined hierarchical arrangement, hash tags from the first set of hash tags with hash tags having a same respective characteristic type from the second set of hash tags.

4. The method of claim 3, wherein sequentially comparing the first set of hash tags with the second set of hash tags further comprises:

the hardware processor determining, using the hierarchical arrangement, a next hash tag from the first set of hash tags;

the hardware processor comparing the next hash tag to a corresponding hash tag from the second set of hash tags; and the hardware processor determining whether the next hash tag represents a mismatch to the corresponding hash tag.

5. The method of claim 1, further comprising:

the hardware processor identifying when there is at least one first hash tag from the first set of hash tags for which there is no corresponding hash tag from the second set of hash tags to be compared against; and in response to identifying that there is at least one first hash tag from the first set of hash tags for which there is no corresponding hash tag from the second set of hash tags to be compared against, the hardware processor:

initiating an order reload that selectively removes, from the second production order, production specifications associated with the at least one first hash tag; and providing production specifications to reverse executed actions associated with production specifications associated with the at least one first hash tag.

6. The method of claim 1, wherein said initiating order fulfillment further comprises:

the hardware processor generating, using the first order specification, the first production order which provides specifications for actions and processes that are used for one or more of configuring a product, providing targeted modifications to a previous product configuration, testing a selected configuration and fulfilling the first order.

7. The method of claim 1, further comprising:

the hardware processor determining whether there is at least one hash tag from the second set of hash tags for which there is no corresponding hash tag from the first set of hash tags to be compared against; and in response to determining that there is at least one hash tag from the second set of hash tags for which there is no corresponding hash tag from the first set of hash tags to be compared against, the hardware processor providing within the second production order new production specifications corresponding to the at least one hash tag from the second set of hash tags.

* * * * *